US006563817B1

(12) United States Patent
Murai

(10) Patent No.: US 6,563,817 B1
(45) Date of Patent: May 13, 2003

(54) COMMUNICATION SYSTEM

(75) Inventor: Toshio Murai, Ichikawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/635,198

(22) Filed: Aug. 9, 2000

Related U.S. Application Data

(62) Division of application No. 08/705,839, filed on Aug. 30, 1996, now Pat. No. 6,208,639.

(30) Foreign Application Priority Data

Aug. 31, 1995 (JP) ............................................ 7-223825

(51) Int. Cl.[7] .............................................. H04L 12/66
(52) U.S. Cl. ...................................... 370/356; 370/401
(58) Field of Search ................................. 370/356, 401, 370/352, 353, 355, 466–467, 471, 375, 376, 372, 392; 379/88.13, 88.14

(56) References Cited

U.S. PATENT DOCUMENTS

| 4,546,468 A | | 10/1985 | Christmas et al. ........... 370/376 |
| 4,740,955 A | * | 4/1988 | Litterer et al. ............... 370/355 |
| 5,497,373 A | * | 3/1996 | Hulen et al. .............. 379/88.13 |
| 5,526,353 A | | 6/1996 | Henley et al. ............... 370/392 |
| 5,604,737 A | | 2/1997 | Iwami et al. ................ 370/352 |
| 5,606,361 A | | 2/1997 | Davidsohn et al. ........... 348/14 |
| 5,640,387 A | * | 6/1997 | Takahashi et al. .......... 370/467 |
| 5,742,596 A | | 4/1998 | Baratz et al. ................ 370/356 |
| 6,208,639 B1 | * | 3/2001 | Murai ......................... 370/356 |

FOREIGN PATENT DOCUMENTS

JP 7-115469 5/1995

* cited by examiner

Primary Examiner—Steven Nguyen
Assistant Examiner—Phuongchau Ba Nguyen
(74) Attorney, Agent, or Firm—Finnegan, Henderson, Farabow, Garrett & Dunner, L.L.P.

(57) ABSTRACT

A private branch exchange comprises trunk circuits, communication highways connected to the trunk circuits for transmitting data of a time-divisional multiplexed channels, and a time switch for switching the communication highways. A communication highway is connected to a computer network via a circuit/packet converter. The computer network comprises branch networks to which the circuit/packet converter is connected, and a root network to which the branch networks are connected through a router/gateway. Each computer terminal has an extension number and IP/port addresses different for such communication functions as audio communication, data communication and the like. The circuit/packet converter has bearer circuits different for each communication function and allocates a specified bearer circuit to each time slot of the communication highway. When a call is originated, the circuit/packet converter controls the time slot of the communication highway such that a bearer circuit vacant and suitable for a call type is connected to the computer terminal. The bearer circuit interfaces data on the computer network with circuit data on the communication highway. Therefore, the computer terminal can be connected to the exchange through the communication highway and caused to function as a terminal connected to the private branch exchange for each of various communication function.

11 Claims, 13 Drawing Sheets

COMMUNICATION SYSTEM

This is a division of application Ser. No. 08/705,839, filed Aug. 30, 1996, now U.S. Pat. No. 6,208,639 which is incorporated herein by reference.

BACKGROUND OF THE INVENTION

1. Field of the Invention

The present invention relates to communication system for performing telephone communication or facsimile transmission by utilizing computer terminals such as personal computers and the like.

2. Description of the Related Art

For such a purpose, there has conventionally been available an apparatus, wherein a personal computer is directly connected to a subscriber's line by fitting a facsimile card or a modem card into the PCMCIA (Personal Computer Memory Card International Association) card slot of the computer.

This apparatus has only a single function system that a card must be prepared for every facsimile transmission or data communication and a PCMCIA card must be replaced by another in order to change a function. It also has a drawback that one computer may monopolize the subscriber's line.

There is another apparatus designed for the same purpose, wherein a plurality of computers are connected to a local area network (Intranet) and further connected to a public switched telephone network by a gate way having a facsimile function or a data communication function. These apparatus allow a plurality of terminals to individually make calls and seemingly share the subscriber's line, since these terminals are connected to the gate way. However, as a telephone number is not assigned to each computer, direct communication addressed to each computer from the public switched telephone network may not be performed and sharing of the subscriber's line is not provided in the true sense of the word. As in the case of the PCMCIA card, this gate way must be prepared for every function and thus this may also has only a single function system.

In such conventional communication system, it is necessary to install large-sized and complicated equipment in order to utilize various functions of the computer by the subscriber's line or an extension line. Therefore, it has been difficult to make sufficient use of various functions of the computer.

SUMMARY OF THE INVENTION

The invention was made to cope with the above-noted situation. Accordingly, it is an object of the present invention to provide a communication system, wherein a computer terminal may communicate with other communication terminals by a public switched telephone network or an extension network with a computer network connected to a subscriber's line or an extension line.

It is another object of the invention to provide a communication system, whereby a plurality of computer terminals may share a subscriber's line and one computer terminal may be utilized as a terminal for various kinds of communication services.

It is yet another object of the invention to provide a private branch exchange, whereby an exchanging operation may be performed for a computer terminal by connecting a computer network to communication highways included therein and the computer terminal may be treated equally with other extension terminals connected to the communication highways or other communication terminals connected to the communication highways by a public switched telephone network.

In order to achieve these objects, according to one aspect of the present invention, a communication system comprises exchanging means including a plurality of communication circuits having communication highways of a plurality of channels, exchange control means for controlling the exchanging means, a computer network connected to the exchange control means and having at least one computer terminal, and data converting means connected between the computer network and the communication highways. The computer terminal comprises control information communicating means for transmitting and receiving call control information with the exchange control means by the computer network and data communicating means for transmitting and receiving data with the data converting means by the computer network. The data converting means comprises mode converting means for converting the mode of transmitted data between the computer network and the communication highways.

According to another aspect of the present invention, a communication system comprises a computer terminal and converting means connected to the digital circuits of a computer network and a public switched telephone network. The computer terminal comprises control information communicating means for transmitting and receiving call control signal with the converting means by the computer network when the terminal communicates with another communication terminal connected to the public switched telephone network, and data communicating means for transmitting and receiving data with the converting means by the computer network. The converting means comprises call control signal transfer means for transferring call control signal between the digital circuits of the computer network and the public switched telephone network, and data converting means for converting the mode of transmitted data between the computer network and the digital circuits of the public switched telephone network.

In accordance with yet another aspect of the present invention, a computer system, connected to a computer network and capable of communicating plural kinds of data, comprises a plurality of communication highways in which a plurality of time slots are time-division multiplexed, an exchange including a time switch for switching the plurality of communication highways wherein each time slot of the communication highways is respectively assigned to any of the plural kinds of data, and interface means connected between the computer network and one of the plurality of communication highways, and for connecting one computer terminal in the computer network to the time slot in accordance with the data type in the communication highway.

In accordance with a further aspect of the present invention, a private branch exchange having a computer terminal capable of communicating plural kinds of data and the terminal is connected to a computer network, comprises a plurality of communication highways in which a plurality of time slots are time-division multiplexed wherein each time slot of the communication highways is respectively assigned to any of the plural kinds of data, a time switch for switching the plurality of communication highways, and interface means connected between the computer network and one of the plurality of communication highways, and for connecting one computer terminal in the computer network to the time slot in accordance with data type in the communication highway.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

The preferred embodiments of the communication system of the present invention will now be described with reference to the accompanying drawings.

[First Embodiment]

Figure 1:
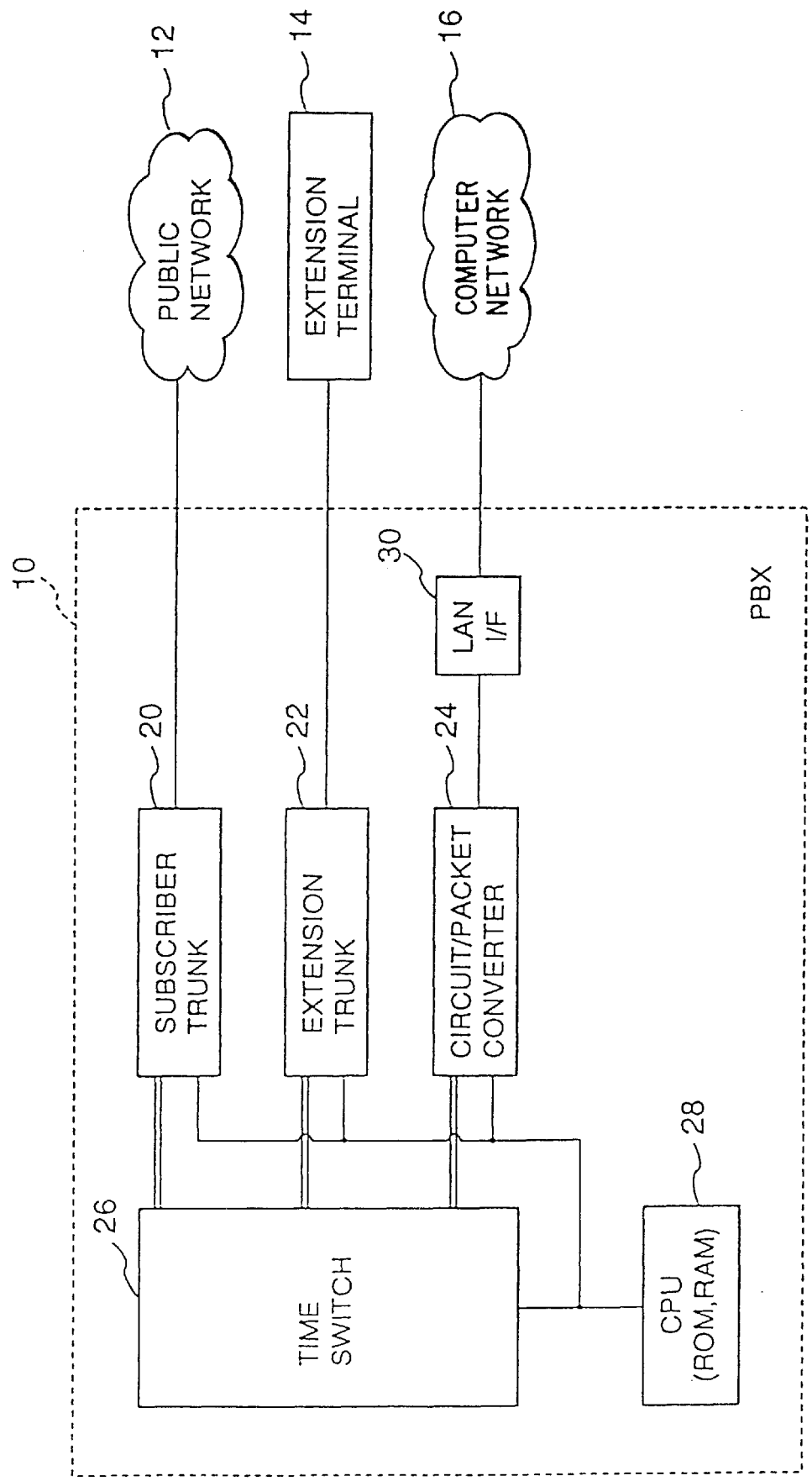
FIG. 1 is a block diagram showing in outline a first embodiment of a communication system of the present invention.

FIG. 1 is a block diagram showing in outline the construction of the first embodiment. In the drawing, there is illustrated a system which connects a computer network 16 to a public switched telephone network 12 or an extension terminal 14 by using a medium-sized or large-sized private branch exchange 10 and thereby permits a plurality of computers to share a subscriber's line, and perform of various data communications by one system. The computer network 16 may be constructed by a local area network (hereinafter called the LAN) as Intranet or by connecting a plurality of LANs over a wide area by Internet. In other words, a plurality of computers may be connected together in a limited area by Intranet or over a wide area by Internet.

The private branch exchange 10 comprises a time switch 26 for realizing an exchanging function, a LAN interface 30 for transmitting and receiving signal to and from the computer network 16, a subscriber trunk 20 connected to the public switched telephone network 12, an extension trunk 22 connected to the extension terminal 14, a circuit/packet converter 24 connected to the computer network 16 via a LAN interface 30, and the CPU (incorporating ROM and RAM) 28 connected to the trunk circuits 20 and 22, the converter 24 and the time switch 26. ROM of the CPU 28 stores tables 1 to 3, later described. The LAN interface 30 and the circuit/packet converter 24 may be provided not in the casing of the PBX 10 but separately.

The trunk circuits 20 and 22 and the converter 24 are connected to the time switch 26 via communication highways. Accordingly, the circuit/packet converter 24 may be seen as one of the trunk circuits in the PBX 10 and a computer terminal included in the computer network 16 may be seen as one of the extension terminals or one of the communication terminals connected to the public switched telephone network. The communication highway having a plurality of channels is provided with a transmission capability of 2 Mbps, in which 32-channel (time slot) data of 64 kbps may be time-division multiplexed.

Figure 2:
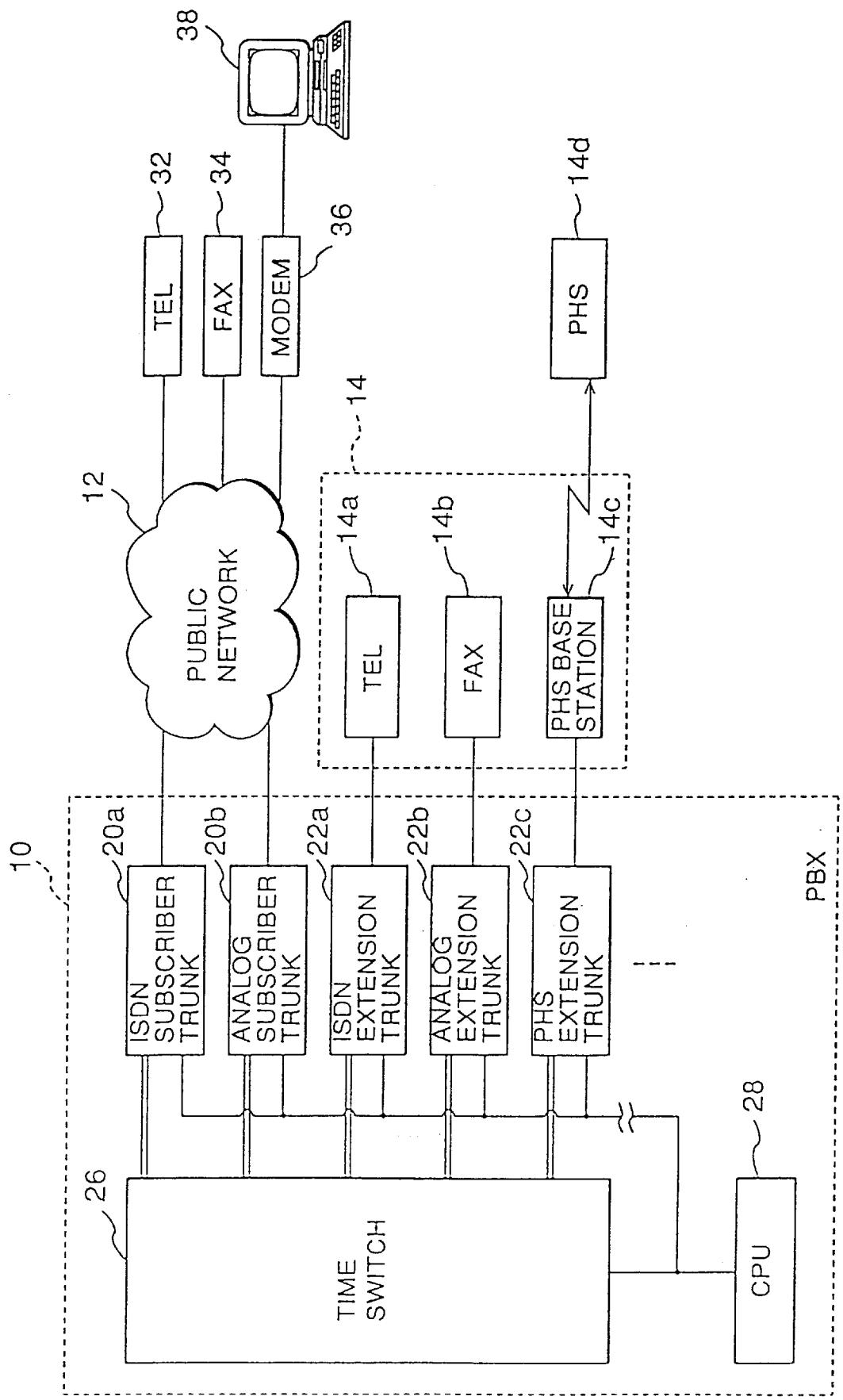
FIG. 2 is a detailed block diagram of a portion relating to a public switched telephone network of FIG. 1.

FIG. 2 illustrate the sections of the public switched telephone network and the extension network of FIG. 1 in detail. To the public switched telephone network 12, for instance, a telephone set 32, a facsimile equipment 34, a data transmission modem 36 connected to a personal computer 38, and the like are connected. The public switched telephone network 12 is connected to the time switch 26 through an ISDN (Integrated Services Digital Network) subscriber trunk 20a and an analog subscriber trunk 20b. For the telephone set 32, a standard telephone set or a digital telephone set may be used. A personal computer having a communication function (with a built-in modem) is directly connected to the public switched telephone network 12.

The extension terminal 14 may be a telephone set 14a, a facsimile equipment 14b, a PHS (personal handyphone system) base station 14c or the like. The base station 14c communicates with a PHS terminal 14d by radio. The telephone set 14a, the facsimile equipment 14b, and the PHS base station 14c as extension terminals are connected to the time switch 26 respectively through an ISDN extension trunk 22a, an analog extension trunk 22b, and a PHS extension trunk 22c.

Figure 3:
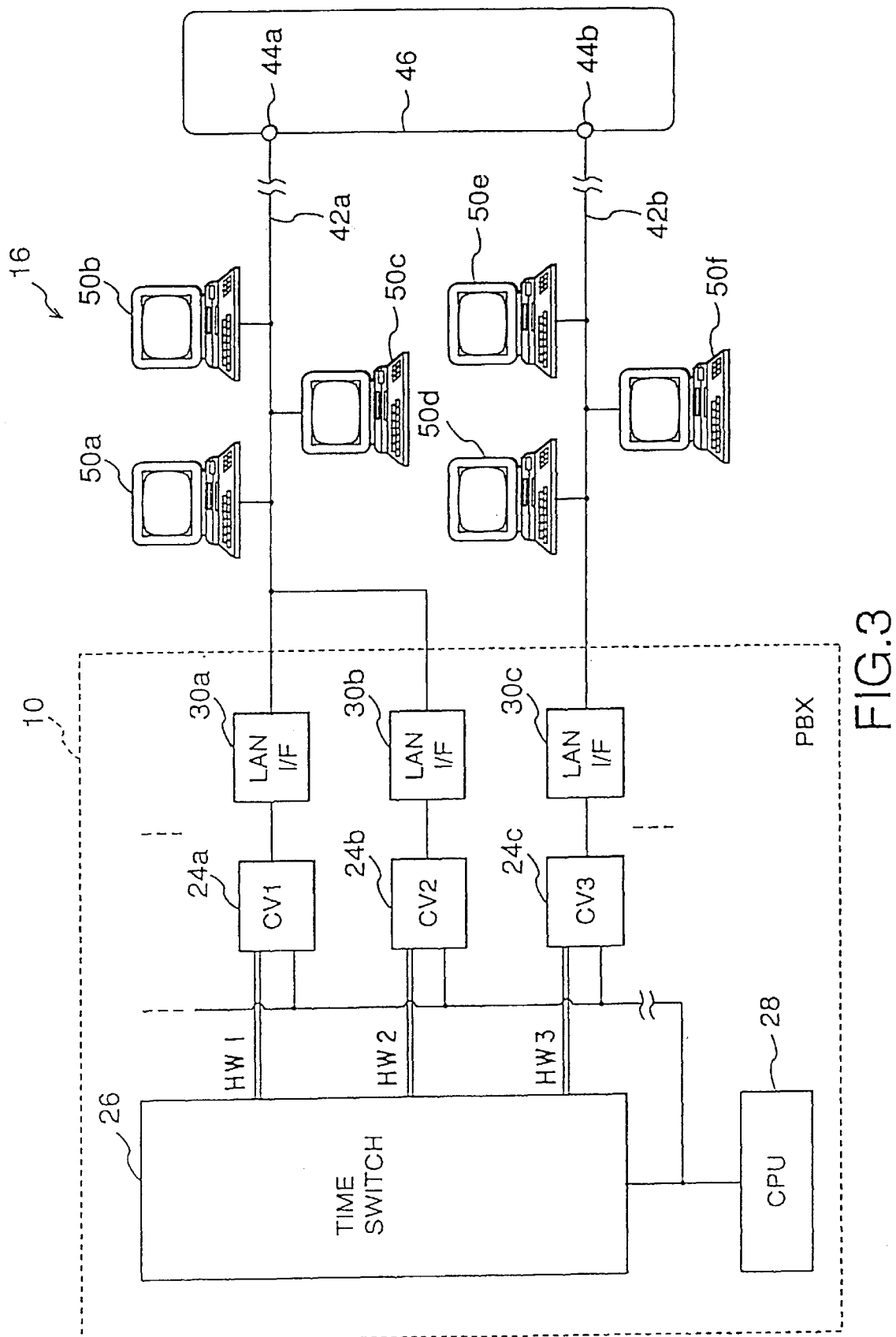
FIG. 3 is a detailed block diagram of a portion relating to a computer network of FIG. 1.

FIG. 3 illustrates the section of the computer network of FIG. 1 in detail. The computer network 16 is composed of Internet 46 with an optical transmission line or a coaxial transmission line connected in a loop form and a plurality (herein, two) of the LANs (Intranet) 42a and 42b connected to this Internet 46 respectively through routers/gateways 44a, 44b, . . . According to the present invention, an Ethernet system is employed as the LAN and each computer terminal performs TCP (Transmission Control Protocol)/IP (Internet Protocol) communication. Being different from the conventional terminal, however, each computer terminal is provided with subscribers' numbers (telephone numbers) as in the case of normal telephone sets in addition to IP/TCP addresses.

A plurality of computer terminals (personal computers, work stations, etc.) 50 are connected to each the LAN 42. The LAN 42 is in turn connected to the circuit/packet converter 24 through the LAN interface 30. The number of circuit/packet converters 24 connected to the LAN may not be limited to one. Also, the number of circuit/packet converters for each the LAN is not limited to one, but a plurality may be provided. Herein, two circuit/packet converters 24a and 24b are connected to the LAN 42a. Hereinbelow, for the purpose of explanation, the circuit/packet converters 24a and 24b will be termed first and second converters CV1 and CV2 and the circuit/packet converter 24c connected to the LAN 42b a third converter CV3.

The circuit/packet converters 24a, 24b, and 24c are provided with functions for converting packet data transmitted from computer terminals 50a to 50f through the LANs 42a and 42b into highway data so as to be transmitted on communication highways HW1, HW2, and HW3 in the PBX 10 and converting data (circuit data) transmitted from the PBX 10 by the communication highways HW1, HW2, and HW3 into packet data so as to be transmitted on the LANs 42a and 42b.

Figure 4:
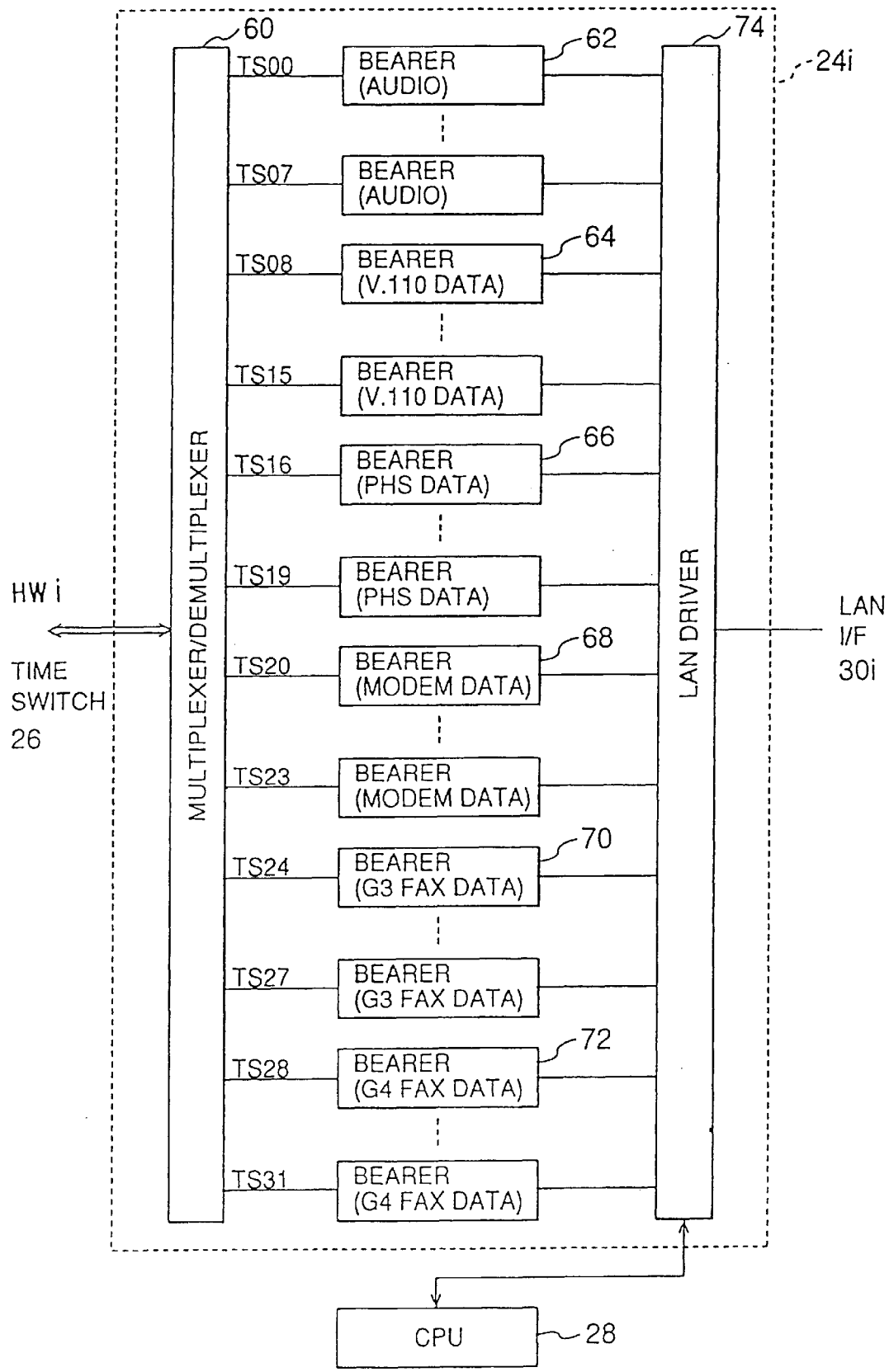
FIG. 4 is a block diagram showing in detail a structure of a circuit/packet converter of FIG. 1.
Figure 5A:
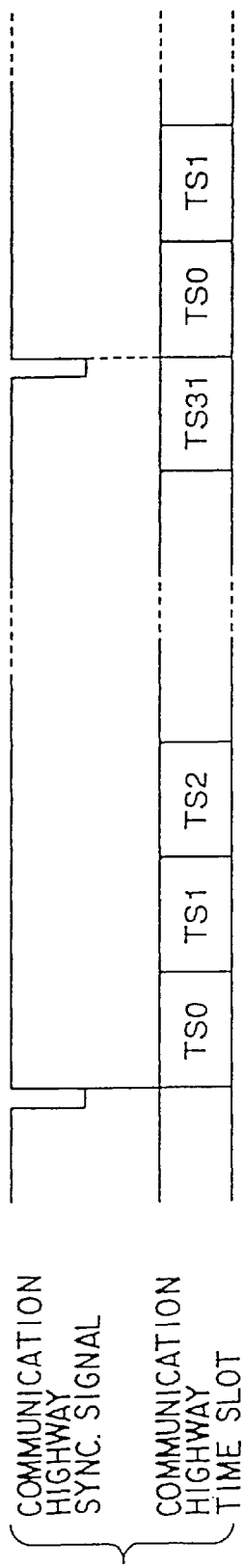
FIGS. 5A and 5B are timing charts showing operations of the circuit/packet converter.
Figure 5B:
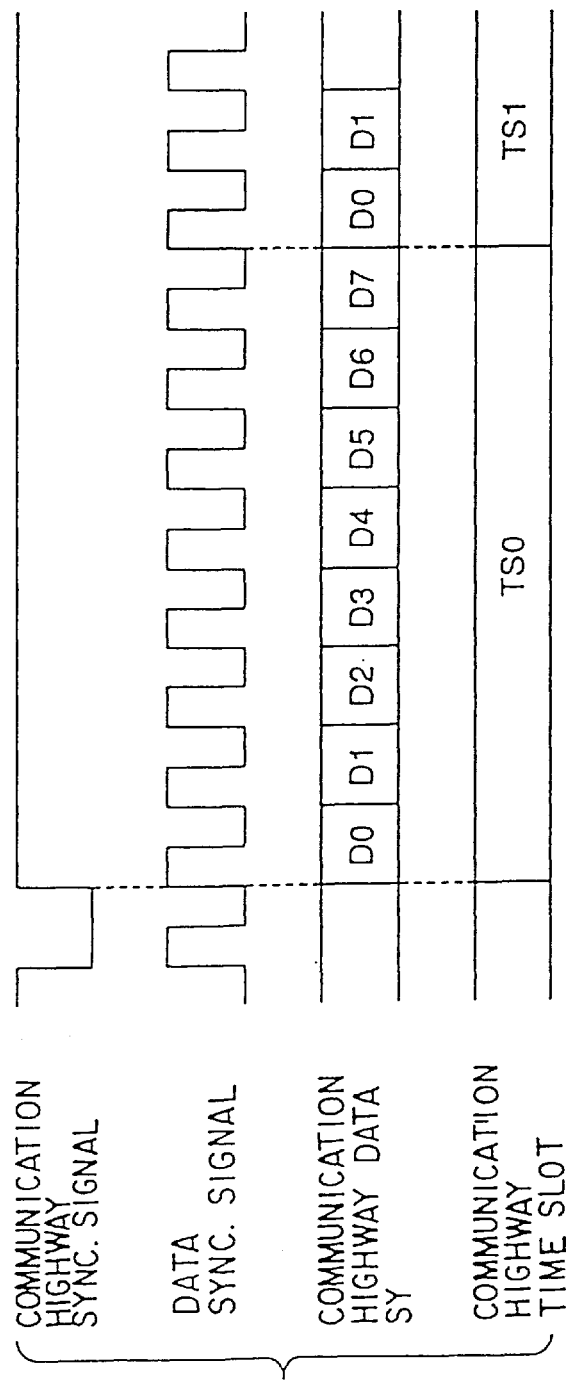

FIG. 4 is a block diagram showing in detail a circuit/packet converter 24i. The communication highway HWi of 2 Mbps connected to the time switch 26 is connected to a multiplexer/demultiplexer 60. Accordingly, highway data of 2 Mbps supplied from the communication highway is divided into data of 64 kbps for each time slot. FIG. 5A is a timing chart showing the time slot of the communication highway and FIG. 5B is a timing chart showing data of each time slot.

Data of each time slot is supplied to a bearer circuit and packetized. Herein, data of time slots TS00 to TS07 are supplied to an audio bearer circuit 62, data of time slots TS08 to TS15 into a V.110 data bearer circuit 64, data of time slots TS16 to TS19 into a PHS data bearer circuit 66, data of time slots TS20 to TS23 into a modem data bearer circuit 68, data of time slots TS24 to TS27 into a G3 fax data bearer circuit 70, and data of time slots TS28 to TS32 into a LAPB G4 fax data bearer circuit 72. These bearer circuits 62, 64, 66, 68, 70, and 72 are parts of those stipulated by ISDN bearer services (circuit switching modem bearer services). The audio bearer is called an audio bearer service of 64 kpbs, the V.110 data bearer is called an unlimited bearer service of 64 kbps, the PHS bearer is called an unlimited bearer service of 32 kbps, the modem data bearer and the G3 facsimile data are called audio bearer services of 64 kbps/3.1 kHz, and the G4 facsimile data is called an unlimited bearer service of 64 kbps.

The bearer circuits 62, 64, 66, 70, and 72 are connected to a LAN driver 74. Destination headers, etc., are added to packets and supplied to a LAN interface 30i. The CPU 28 is connected to the LAN driver 74.

Figure 6:
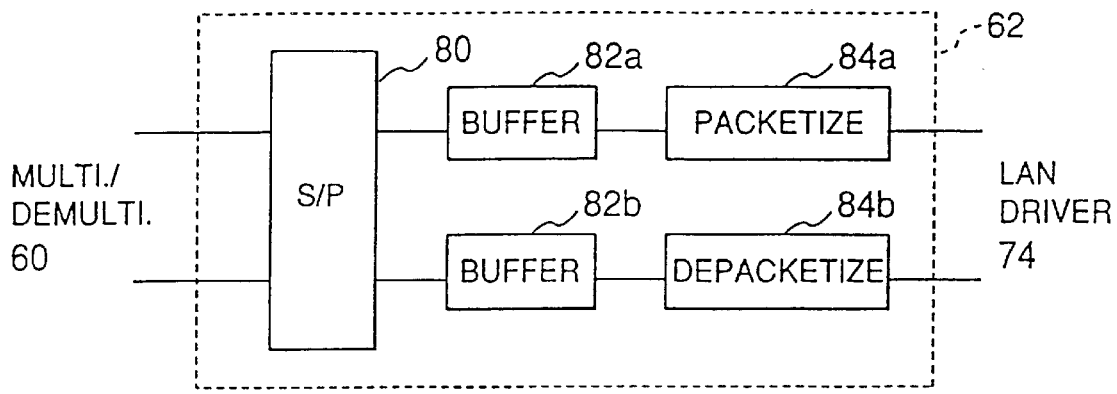
FIG. 6 is a block diagram of an audio bearer circuit in the circuit/packet converter.
Figure 7:
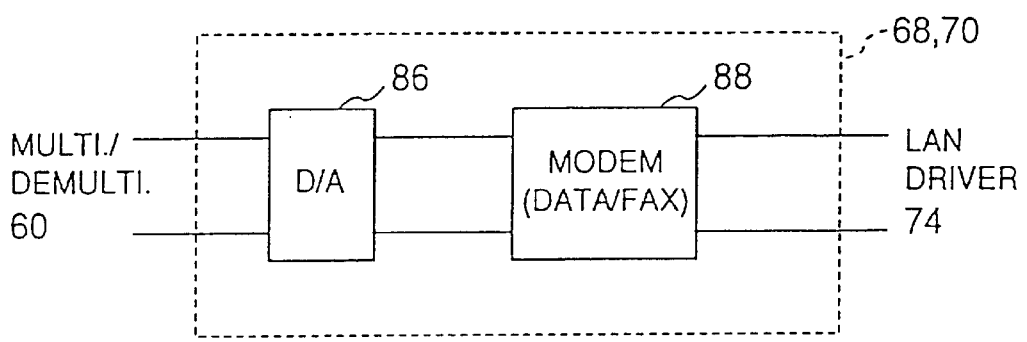
FIG. 7 is a block diagram of a modem-G3 fax bearer circuit in the circuit/packet converter.

FIG. 6 is a block diagram of the audio bearer circuit 62 and FIG. 7 a block diagram of the modem bearer circuit 68 or the G3 fax bearer circuit 70.

The audio bearer circuit 62 comprises a serial/parallel converter 80 connected to the multiplexer/demultiplexer 60 and 8-bit serial data output from the serial/parallel converter 80 is supplied to the LAN driver 74 through a buffer 82a and a packetizing circuit 84a. Packet data supplied from the LAN is changed to be serial data by a depacketizing circuit 84b and then supplied to the serial/parallel converter 80 through a buffer 82b. Parallel data output from the serial/parallel converter 80 is supplied to the multiplexer/demultiplexer 60.

The mode bearer circuit 68 or the G3 fax bearer circuit 70 comprises a digital/analog converter 86 connected to the multiplexer/demultiplexer 60 and a data modem or a fax modem 88. The data modem or the fax modem 88 is connected to the LAN driver 74.

Figure 8A:
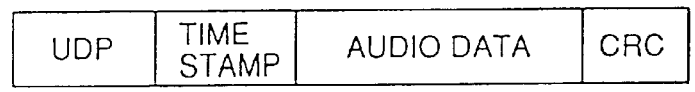
FIGS. 8A and 8B are timing charts showing formats of packet data on the LAN of the first embodiment.
Figure 8B:

FIGS. 8A and 8B illustrate the format of transmitted packet data on the computer network 16. In the case of audio data, as shown in FIG. 8A, a header having a UDP address is followed by a time stamp indicating transmission time, an audio data packet, and an CRC for error correction in order. In the case of data other than audio, for instance character data, as shown in FIG. 8B, a header having a TCP address is followed by a character data packet and CRC for error correction in order.

Figure 9:
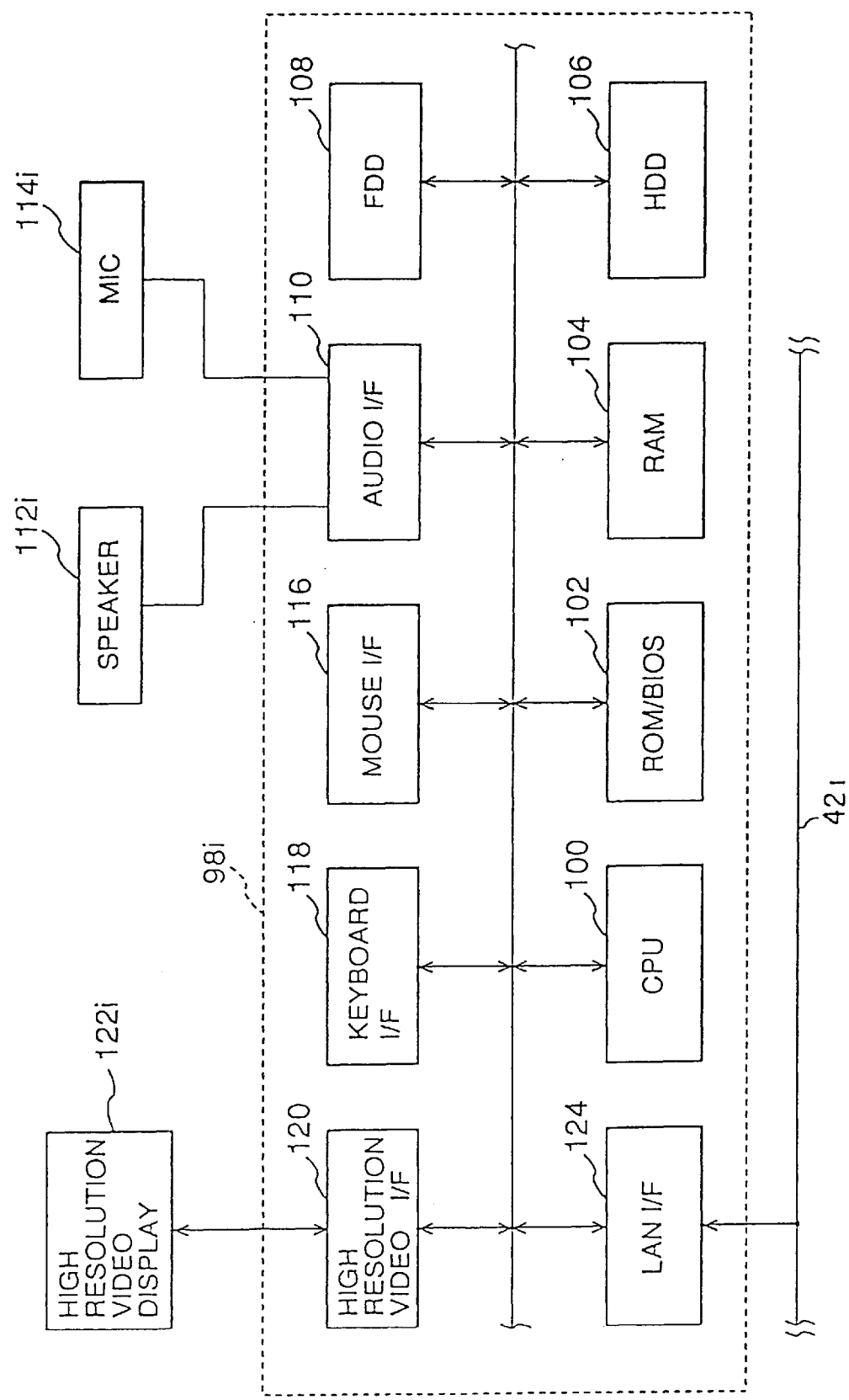
FIG. 9 is a block diagram showing in detail a structure of a personal computer of the first embodiment.

FIG. 9 is a block diagram of a computer terminal 98i. This terminal 98i comprises a main body 98i connected to the LAN 42i, a microphone 114i for inputting audio data to be transmitted by telephone, a speaker 112i for reproducing transmitted audio data, and a high resolution video display 122i for fax and TV telephone functions. The main body 98i comprises a CPU 100, a ROM/BIOS 102, a RAM 104, a hard disk drive 106, a floppy disk drive 108, an audio interface 110, a mouse interface 116, a keyboard interface 118, a high resolution video interface 120, and a LAN interface 124. It is not necessary, however, for all the terminals to have the above-noted audio communication function, a facsimile communication function for inputting/outputting still image data or a television conference function for inputting/outputting moving image data. These functions may be selected for each terminal as needed.

Now, the operation of the first embodiment will be described. As previously described, the Ethernet system is employed as the LAN and each computer terminal performs TCP/IP communication. UDP (user Datagram Protocol) is provided to supplement TCP. IP establishes a transmission path and logically manages the network based on the definitions of a network address and a host address. A 32-bit IP address is allocated to each terminal. The IP address is represented by converting this into a decimal numeral with 1 byte (8 bits) as a unit and dividing the decimal numeral by periods. TCP and UDP are managed based on port numbers.

In the embodiment, the CPU 28 in the PBX 10 stores a correspondence table (Table 1) between an IP address and the extension number of each computer terminal and for each call type (the kind of communication data). The same IP address is allocated to each terminal. However, a different port address is allocated for each call type and a different address is allocated for each kind of communication data. As noted above, A, B, C and D of the IP port address respectively represent decimal numerals.

According to the present invention, the circuit/packet converter 24 and the computer terminal 50 connected thereto are assigned to same the LAN. However, as long as no troubles occur in communication, for instance transmission delaying, the converter 24 and the computer terminal 50 may be connected together by an Intranet 46 and a computer terminal on another the LAN may be assigned as an extension line and included in the PBX 10.

TABLE 1

| TEL NO. | TYPE OF CALL | IP/PORT ADDRESS |
|---|---|---|
| 301(50a) | AUDIO (64 Kbps AUDIO) | A.B.C.D1/UDP1 |
| | V.110 DATA (64 Kbps UNRESTRICT) | A.B.C.D1/TCP1 |
| | PHS DATA (32 Kbps UNRESTRICT) | A.B.C.D1/TCP2 |
| | MODEM DATA (64 Kbps/3.1 kHz AUDIO) | A.B.C.D1/TCP3 |
| | G3 FAX DATA (64 Kbps/3.1 kHz AUDIO) | A.B.C.D1/TCP4 |
| | LAPB G4 FAX DATA (64 Kbps UNRESTRICT) | A.B.C.D1/TCP5 |
| 302(50b) | AUDIO | A.B.C.D2/UDP1 |
| 303(50c) | PHS DATA | A.B.C.D3/TCP2 |
| 304(50d) | AUDIO | A.B.C.D4/UDP1 |
| | V.110 DATA | A.B.C.D4/TCP1 |
| | PHS DATA | A.B.C.D4/TCP2 |
| | MODEM DATA | A.B.C.D4/TCP3 |
| | G3 FAX DATA | A.B.C.D4/TCP4 |
| | LAPB G4 FAX DATA | A.B.C.D4/TCP5 |
| 305(50e) | MODEM DATA | A.B.C.D5/TCP3 |
| | G3 FAX DATA | A.B.C.D5/TCP4 |
| 306(50f) | V.110 DATA | A.B.C.D6/TCP1 |
| | LAPB G4 FAX DATA | A.B.C.D6/TCP5 |
| ... | ... | ... |

The CPU 28 also stores Table 2 indicating which circuit/packet converter the computer terminal (IP address) is connected to (included), since a plurality of circuit/packet converters may be connected to one the LAN as shown in FIG. 3.

TABLE 2

| IP ADDRESS | CIRCUIT/PACKET CONVERTER |
|---|---|
| A.B.C.D1 | CV1 |
| | CV2 |
| A.B.C.D2 | CV1 |
| | CV2 |
| A.B.C.D3 | CV1 |
| | CV2 |
| ... | ... |
| A.B.C.D4 | CV3 |
| A.B.C.D5 | CV3 |
| A.B.C.D6 | CV3 |
| ... | ... |

The operations of the embodiment depend upon two cases: the computer terminal is a call originating terminal or a receiver terminal. First, explanation will be made of the case where a call is originated to the telephone set 14a connected to the ISDN extension line from any of the computer terminals (herein, 50a) connected to the LANs 42a and 42b, and audio communication is performed therebetween.

When a user makes a call in the computer terminal 50a (extension number 301), the computer terminal 50a first produces a call originating packet equivalent to Q931 in a call control procedure stipulated by layer 3 in ISDN. The call originating packet has information indicating a call originating terminal, a destination, and a call type. This call originating packet is supplied from the LAN 42a through the LAN interface 30a and the LAN driver 74 in the converter (CV1) 24a into the CPU 28 in the PBX 10.

The CPU 28 retrieves an IP address/port address from the telephone number and the call type (herein, audio) of the call originating terminal contained in this call originating packet, by utilizing Table 1. A. B. C. D1/TCP1 is detected herein. Then, the CPU 28 retrieves the circuit/packet converter including this IP address, by utilizing Table 2. CV1 and CV2 are detected herein.

The CPU 28 has a connection situation table for each circuit/packet converter. An example of a connection situation table regarding the converter CV1 is shown in a table 3. The connection situation table describes a connection state for each of the time slot numbers TS00 to TS31 of the communication highways connected to the converter.

TABLE 3

| TIME SLOT | TYPE OF CALL | CONNECTION |
|---|---|---|
| TS00 | AUDIO | A.B.C.D1/UDP1(50a) |
| TS01 | | A.B.C.D2/UDP1(50b) |
| TS02 | | NONE |
| ... | | ... |
| TS07 | | NONE |
| TS08 | V.110 DATA | A.B.C.D1/TCP1(50a) |
| TS09 | | NONE |
| ... | | ... |
| TS15 | | NONE |
| TS16 | PHS DATA | A.B.C.D1/TCP2(50a) |
| TS17 | | A.B.C.D3/TCP2(50c) |
| TS18 | | NONE |
| TS19 | | NONE |
| TS20 | MODEM DATA | A.B.C.D1/TCP3(50a) |
| TS21 | | NONE |
| TS22 | | NONE |
| TS23 | | NONE |
| TS24 | G3 FAX DATA | A.B.C.D1/TCP4(50a) |
| TS25 | | NONE |
| TS26 | | NONE |
| TS27 | | NONE |
| TS28 | LAPB G4 FAX DATA | A.B.C.D1/TCP5(50a) |
| TS29 | | NONE |
| TS30 | | NONE |
| TS31 | | NONE |

The CPU 28 identifies a vacant time slot (time slot TS00 herein) capable of audio communication in accordance with the connection situation table of the converter CV1, writes the IP address/port address (A. B. C. D1/UDP1) of the computer terminal 50a as the call originating into a connection section and instructs the circuit/packet converter CV1 to connect the time slot TS00 of the communication highway HW1 with an audio packet. Accordingly, this makes it possible to convert audio data between the time clot TS00 of the communication highway and the computer terminal 50a as the call originating in accordance with the connection situation table (table 3), in the circuit/packet converter CV1.

The CPU 28 also instructs the computer terminal 50a as the call originating to transmit/receive audio data by specifying the IP address (e.g., A, B, C and D6) of the circuit/packet converter CV1 as the destination of the audio packet.

If it is found that the audio communication time slots TS00 to TS07 of the converter CV1 have all been connected, the call originating terminal 50a may use another converter CV2 as shown in Table 2. The table 3 shows that the computer terminal 50a performs audio communication by using the time slot TS00 among 32 time slots of the converter CV1, the computer terminal 50b performs audio communication by using the time slot TS01, the computer terminal 50a performs V. 101 data communication by using the time slot TS08 and PHS communication by using the time slot TS16, the computer terminal 50c performs PHS communication by using the time slot TS17, and the computer terminal 50a performs modem data communication by using the time slot TS20, G3 fax communication by using the time slot TS24, and G4 fax communication by using the time slot TS28. "NONE" in the connection section means that a slot is vacant. In this manner, since a port address different for each function (call type) is allocated to each terminal, it is possible for the same terminal to simultaneously perform plural kinds of communication. It is also possible for a plurality of terminals connected to the same converter to simultaneously perform communications in a time-division multiplexed manner.

If it is found that all the time slots of the corresponding call type for all the converters with the terminal connected thereto are occupied, a disconnect packet equivalent to Q931 is returned to the call originating computer terminal 50a in order to make a disconnect request and the process is then placed under a standby state.

After the call originating computer terminal 50a has been connected to the communication highway HW1 through the circuit/packet converter CV1, the private branch exchange 10 transmits a calling signal to the called digital telephone set 14a. The private branch exchange 10 transmits a ring back tone to the call originating computer terminal 50a through the time switch 26. This ring back tone is transmitted through the communication highway HW1 to the circuit/packet converter CV1, converted to an audio packet in this converter CV1, and transmitted to the call originating computer terminal 50a. Thereafter, this tone is amplified and output by the speaker and informed the call originating person.

After the user of the called digital telephone set 14a has responded by hooking off in this state, the time switch 26 in the private branch exchange 10 connects the called digital telephone set 14a to the communication highway HW1 to which the call originating computer terminal 50a is connected. Accordingly, it is possible thereafter to perform bi-directional transmission of audio data between the computer terminal 50a and the called digital telephone set 14a by way of the LAN 42a, the circuit/packet converter CV1, the communication highway HW1, the time switch 26 of the private branch exchange 10, the ISDN extension trunk 22a, and the ISDN extension line. In other words, audio data may be transmitted by way of the communication highway serving as a high speed transmission channel.

After communication has been finished and when disconnection is performed in the digital telephone set 14a, a disconnect signal is output from the digital telephone set 14a. Upon receiving this disconnect signal, the CPU 28 releases the time switch 26 by erasing (write "NONE") the IP/port address of the call originating terminal written in the connection section of the corresponding time slots in the connection situation table of the relevant converter as shown in FIG. 3. The CPU 28 sends out a busy sound to the time slot in communication highway HW (the time slot TS00 of HW1) to which the computer terminal 50a is connected. When the CPU 28 is received a disconnect packet equivalent to Q931 from the computer terminal 50a through the LAN 42a, the CPU 28 instructs the circuit/packet converter CV1 to disconnect the communication highway HW1 so as to stop data conversion between the communication highway HW1 and the LAN 42a.

The CPU 28 performs similar processing when a disconnecting operation is performed in the computer terminal 50a. That is, the CPU 28 instructs the circuit/packet converter CV1 to stop data conversion by disconnecting the communication highway HW1.

The above description relates to the case where audio communication is performed between the computer terminal 50a and the extension telephone set 14a by originating a call from the former to the latter. Next, explanation will be made of a reverse case where audio communication is performed between the telephone set 14a connected to the ISDN extension line and the computer terminal 50a connected to the LAN 42a by originating a call from the former to the latter.

The CPU 28 retrieves the port address (A. B. C. D1/UDP1) for audio communication of the called terminal 50a in accordance with Table 1 and retrieves the converter (CV1 or CV2) to which the terminal 50a is connected, in accordance with Table 3. The CPU 28 notifies the called computer terminal 50a of a called packet equivalent to Q931 by way of the LAN driver 74 in the converter (CV1) 24a, the LAN interface 30a, and the LAN 42a.

After the computer terminal 50a has responded, the CPU 28 executes processing similar to that in the case of a call originated from the computer terminal to the telephone set as described above. That is, the CPU 28 instructs the circuit/packet converter CV1 or CV2 to perform data conversion based on the connection situation table in Table 3, making it possible to perform communication thereafter.

In the above description, the case of audio communication was taken as an example. In addition, image data communication by means of a facsimile equipment or data communication by using a modem may similarly be performed by selecting the G3 fax bearer circuit 70 or the modem bearer circuit 68 (time slot corresponding to this) provided in the circuit/packet converter CV1, CV2 or . . . , in accordance with the type of a call.

As discussed above, in the first embodiment, the LANs 42a, 42b, . . . with the computer terminals 50a, 50b, . . . are connected to the communication highways HW1, HW2, . . . by way of the circuit/packet converters CV1, CV2, . . . , call control information is transmitted through the LAN to the CPU 28 in the private branch exchange 10 when calls are to be originated or received by the computer terminals 50a, 50b, . . . Thereby, communication channels are set between the computer terminals 50a, 50b, . . . and the private branch exchange 10, passing through the LANs 42a, 42b, . . . , the circuit/packet converters CV1, CV2, . . . , and the communication highways HW1, HW2, .Therefore, it is possible to transmit data between the computer terminals 50a, 50b, . . . and destination terminals through the communication channels.

According to the first embodiment, since data, for instance audio data, transmitted from the computer terminal is sent via such high-speed transmission channel as the communication highway and the like, it is possible to minimize influence of packet delaying or fluctuation as compared with the case where the computer terminal on the LAN performs direct telephone communication only by way of the LAN. This makes it possible to perform high-quality and bi-directional audio, facsimile or modem communication by the computer terminals 50a, 50b, . . . connected to the LAN, sufficiently keeping to real time.

Also, since data of the computer terminals 50a, 50b, . . . is transmitted from the LAN through the converter, not using other LANs by routers or bridges, traffic on the LAN will not be large and any influence is not given on other data communications.

Furthermore, the computer terminals 50a, 50b, . . . are only connected to the LAN and it is not necessary to pull in other communication circuits, for instance an ISDN extension line. Accordingly, each of the computer terminals 50a, 50b, . . . needs only be provided with a LAN interface board and it is not necessary to incorporate another interface such as an ISDN interface board and the like. Therefore, it is possible to make simple and small the structures of the computer terminals 50a, 50b, . . . and reduce a burden on the user.

Referring to the private branch exchange 10, the communication highways HW1, HW2, . . . in which a plurality of time slots are multiplexed in a time-division manner are directly extended from the time switch 26 to the circuit/packet converters CV1, CV2, . . . Thus, it is not necessary to provide a special interface in the time switch 26. This makes it unnecessary to prepare interface cards, such as various trunk circuits and line circuits respectively provided for conventional trunk lines and extension lines, in the communication highways. As a result, it is possible to make small the line interface section of the private branch exchange 10. Furthermore, since port addresses different for functions (call types) are allocated to each terminal, the same terminal is permitted to simultaneously perform plural kinds of communications. A plurality terminals connected to the same converter are also permitted to simultaneously perform communications in a time-division multiplexed manner.

Next, other embodiments of the present invention will be described. In the following embodiments, the same parts as in the first embodiment are given the same reference numerals and detailed description thereof will be omitted.

[Second Embodiment]

Figure 10:
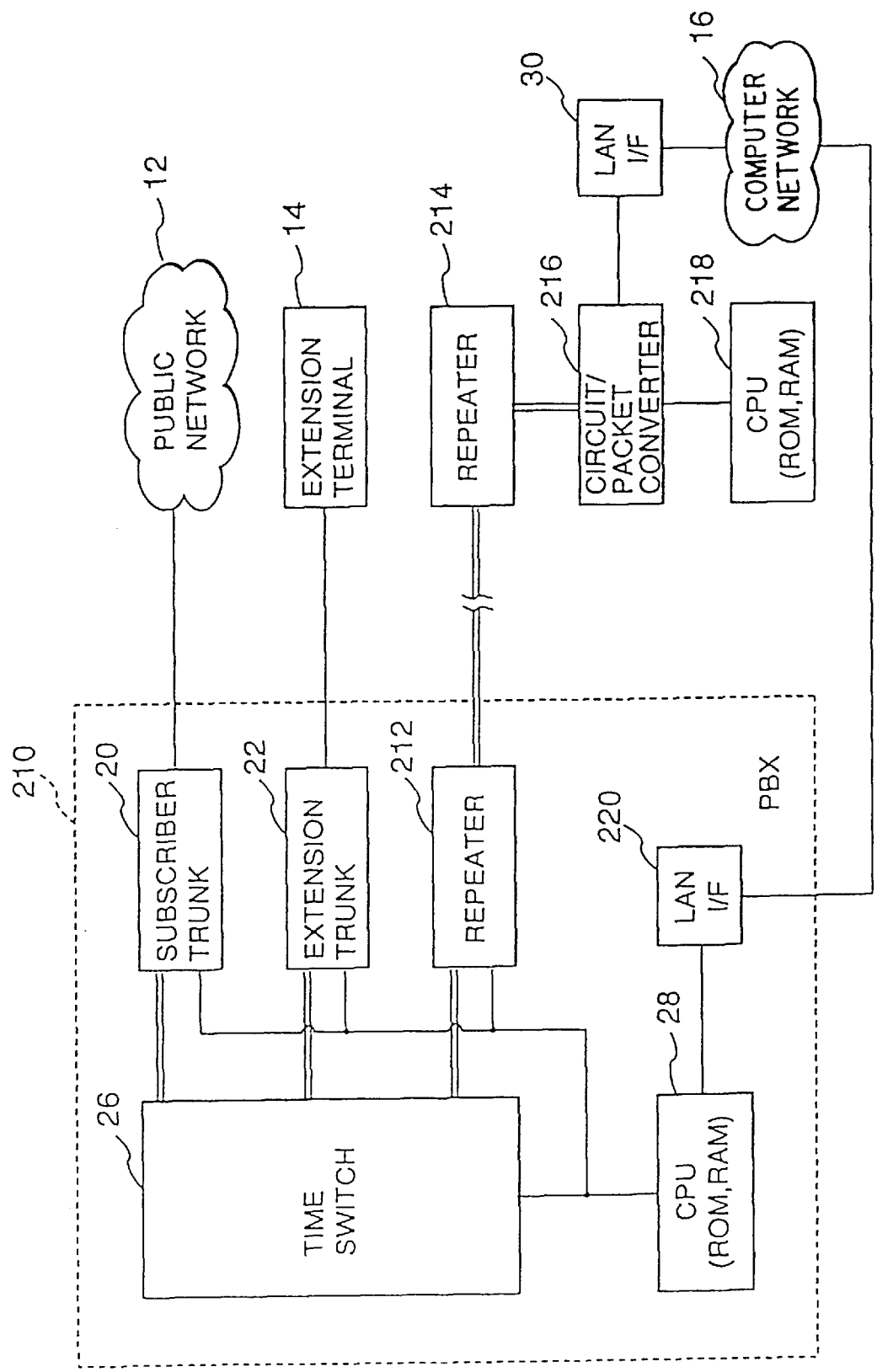
FIG. 10 is a block diagram showing in outline a second embodiment of a communication system of the present invention.
Figure 11:
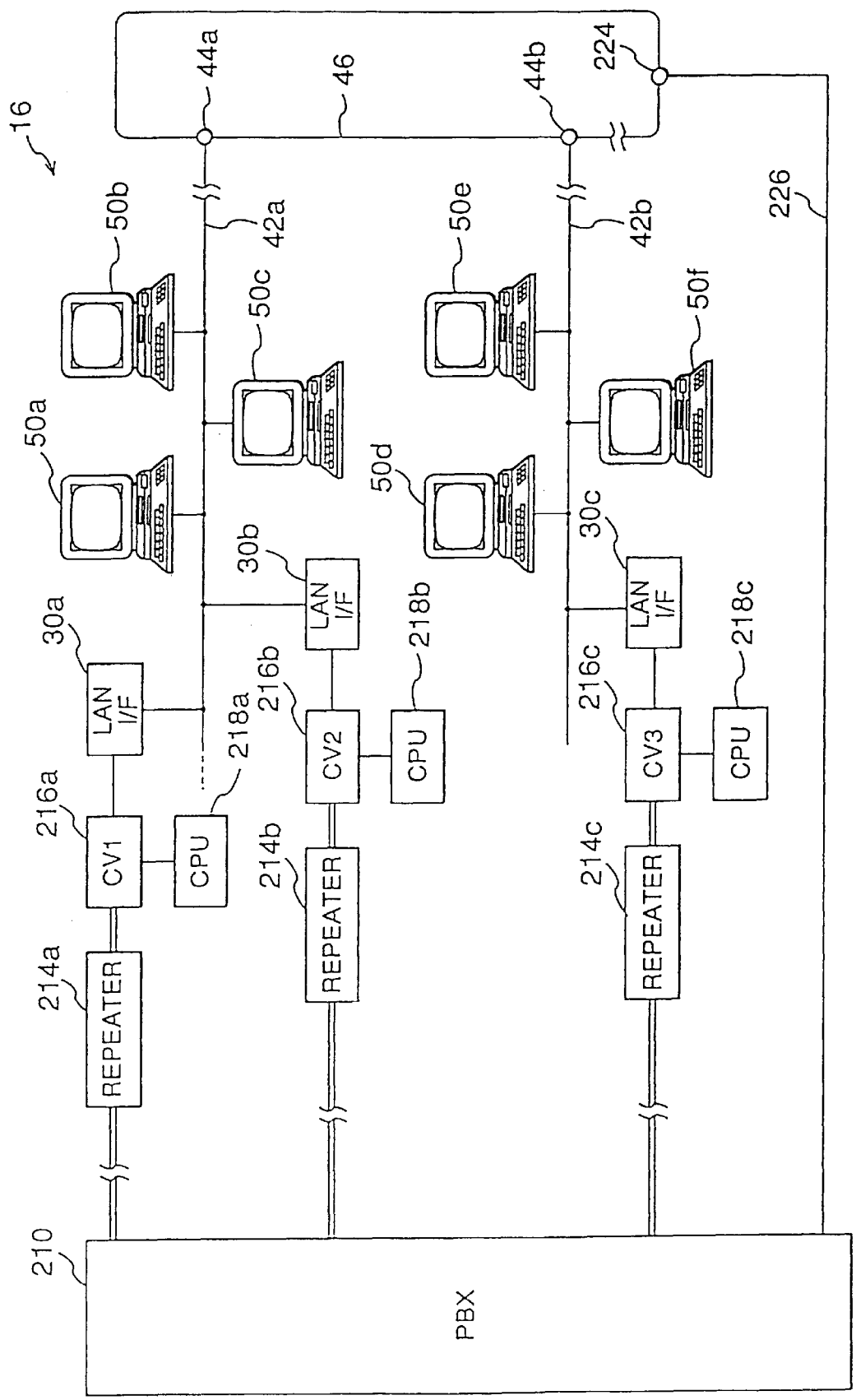
FIG. 11 is a detailed block diagram of a portion relating to a computer network of FIG. 10.

In the first embodiment, since the private branch exchange 10 is disposed in a position close to the computer network 16, the CPU 28 in the PBX 10 can control the converter 24 and the circuit/packet converter 24 and the LAN interface 30 can be housed in the casing of the private branch exchange 10. However, the second embodiment relates to the case where the computer network 16 and the private branch exchange 10 are placed away from each other. FIG. 10 illustrates the whole second embodiment in outline, corresponding to FIG. 1 of the first embodiment. FIG. 11 is a detailed block diagram of the computer network section of the second embodiment, corresponding to FIG. 3 of the first embodiment. The structure of the public switched telephone network of the second embodiment is the same as that in the first embodiment, corresponding to FIG. 2.

Referring to FIG. 10, a private branch exchange 210 comprises the time switch 26 for realizing an exchange function, the subscriber trunk 20 connected to the public switched telephone network 12, the extension trunk 22 connected to the extension terminal 14, a repeater 212 connected to the computer network 16, a LAN interface 220 connected to the computer network 16 and, the CPU (incorporating ROM and RAM) 28. The ROM of the CPU 28 stores Tables 1 and 2 and Table 4, later described, instead of Table 3.

The repeater 212 is connected to the time switch 26 by way of the communication highway and to a circuit/packet converter 216 through the communication highway and a repeater 214 disposed in the vicinity of the computer network 16. The CPU (incorporating ROM and RAM) 218 is connected to the circuit/packet converter 216. The ROM of the CPU 218 stores Table 5, later described. The circuit/packet converter 216 is connected to the computer network 16 through the LAN interface 30. The computer network 16 is also connected to the LAN interface 220 in the PBX 210.

FIG. 11 illustrates the computer network section of FIG. 11 in detail. The computer network 16 comprises the Internet 46, a plurality of LANs (Intranet) 42 connected to this Internet 46 by way of the router/gateway 44, and a control packet transmission LAN (Intranet) 226 connected to the Internet 46 by way of a router/gateway 224. The LAN 226 is connected to the CPU 28 through the LAN interface 220 in the PBX 210.

As in the case of the first embodiment, a plurality of computer terminals 50 (e.g., personal computers and work stations) are connected to each LAN 42. The LAN 42 is connected to the circuit/packet converter 216 through the LAN interface 30. The circuit/packet converter 216 is connected to the time switch 26 through the repeater 214, the communication highway, the repeater 212, and the communication highway.

Figure 12:
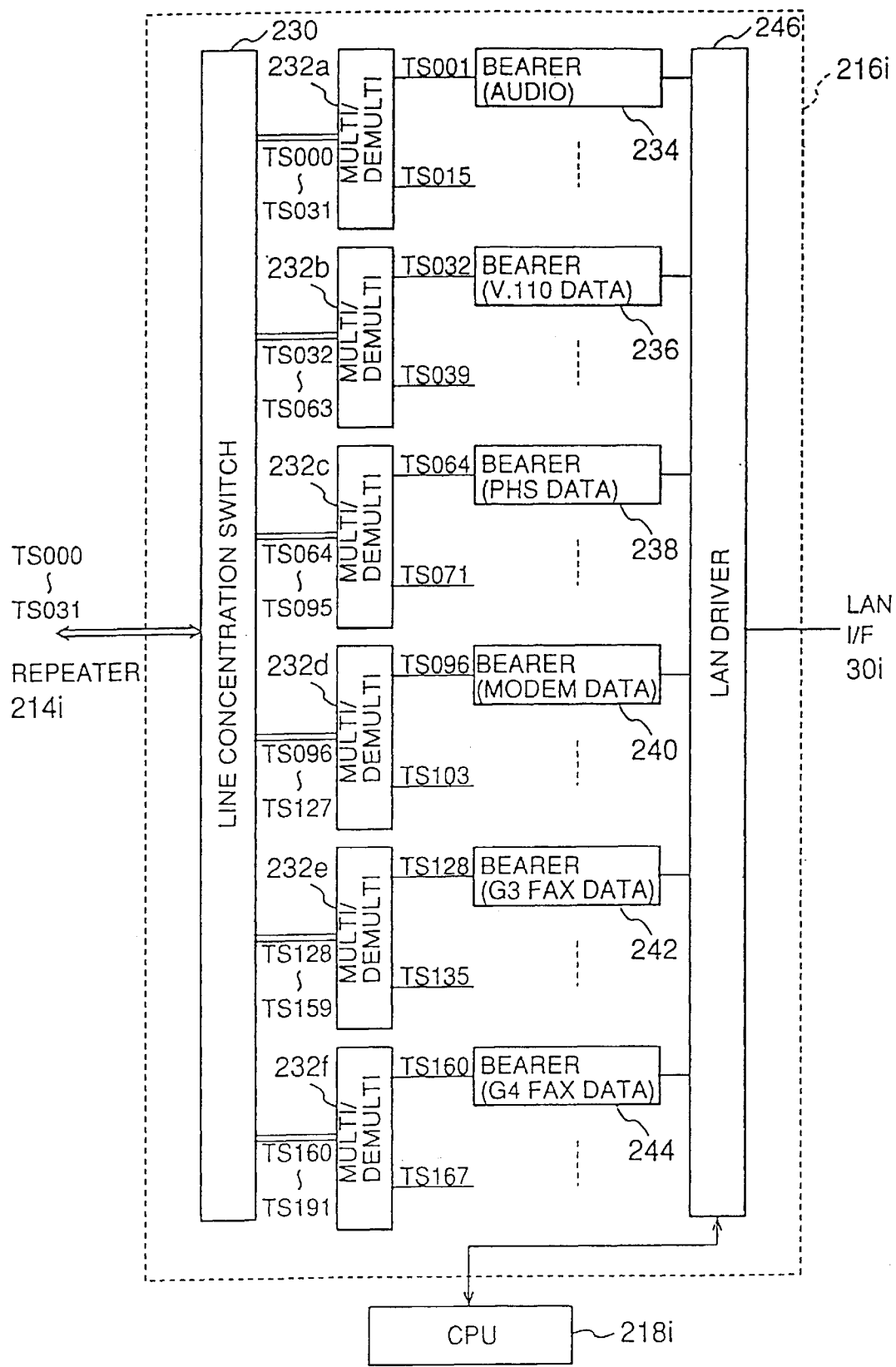
FIG. 12 is a block diagram showing in detail a structure of a circuit/packet converter of FIG. 10.

FIG. 12 is a block diagram showing the circuit/packet converter 216i in detail. The communication highway of 2 Mbps (composed of time slots TS00 to TS31) connected to the time switch 26 is connected to a line concentration switch 230 by way of the repeater 214i. The repeater 214i is connected to multiplexers/demultiplexers 232a to 232f for call types and distributes the time slots of the communication highway of 2 Mbps to the multiplexers/demultiplexers 232a to 232f. For the purpose of explanation, time slots for the multiplexer/demultiplexer 232a are assumed to be TS000 to TS031, time slots for the multiplexer/demultiplexer 232b TS032 to TS063, time slots for the multiplexer/demultiplexer 232c TS064 to TS095, time slots for the multiplexer/demultiplexer 232d TS096 to TS127, time slots for the multiplexer/demultiplexer 232e TS128 to TS159, and time slots for the multiplexer/demultiplexer 232f TS160 to TS191.

The multiplexers/demultiplexers 232a to 232e divide data of 2 Mbps supplied from the communication highway into data of 64 kbps for 32 time slots. It is not necessary, however, for all the multiplexers/demultiplexers 232a to 232e to use data of 32 channels. Only the channels selected in accordance with the frequency in use of each function may be used (bearer circuits may be connected). To be specific, the audio bearer multiplexer/demultiplexer 232a uses only 16 channels of TS000 to TS015, the V.110 data bearer multiplexer/demultiplexer 232b only 8 channels of TS032 to TS039, the PHS data bearer multiplexer/demultiplexer 232c only 8 channels of TS064 to TS071, the modem data bearer multiplexer/demultiplexer 232d only 8 channels of TS096 to TS103, the G3 fax data bearer multiplexer/demultiplexer 232e only 8 channels of TS128 to TS135, and the LAPB G4 fax data bearer multiplexer/demultiplexer 232f only 8 channels of TS160 to TS167. Accordingly, 16 audio bearer circuits 234 are connected to the multiplexer/demultiplexer 232a, 8 V.110 data bearer circuits 236 to the multiplexer/demultiplexer 232b, 8 PHS data bearer circuits 238 to the multiplexer/demultiplexer 232c, 8 modem data bearer circuits 240 to the multiplexer/demultiplexer 232d, 8 G3 fax data bearer circuits 242 to the multiplexer/demultiplexer 232e and 8 G4 fax data bearer circuits 244 to the multiplexer/demultiplexer 232f.

These bearer circuits 234, 236, 238, 240, 242, and 244 are the same as the bearer circuits 62, 64, 66, 68, 70, and 72 in the first embodiment. The bearer circuits 234, 236, 238, 240, 242, and 244 are connected to a LAN driver 246, destination headers, etc., are added to packets and these packets are supplied to the LAN interface 30i.

The operation of the second embodiment will now be described. It is assumed that the telephone set 14a connected to the ISDN extension line originates a call to the computer terminal 50a and audio communication is performed therebetween.

When the user of the telephone set 14a originates a call, a call originating packet having information about a call originating telephone number, a called telephone number, and a call type is supplied to the CPU 28 of the PBX 10.

As in the case of the first embodiment, the CPU 28 retrieves the IP address/port address of a called terminal in accordance with Table 1 and retrieves a circuit/packet converter including this IP address in accordance with Table 2. More particularly, Table 1 shows that an audio incoming call to the computer terminal 50*a* having an extension number 301 is connected to A. B. C. D1/UDP1. Table 2 shows that the terminal having address A. B. C. D1/UDP1 utilizes CV1 or CV2.

The CPU 28 is provided with a connection situation table for each communication highway of the circuit/packet converter as shown in Table 4.

TABLE 4

| CIRCUIT/PACKET CONVERTER | TIME SLOT | TYPE OF CALL |
|---|---|---|
| CV1 | TS00 | AUDIO |
|  | TS01 | V.110 DATA |
|  | TS02 | NONE |
|  | ... | ... |
|  | TS31 | NONE |
| CV2 | TS00 | NONE |
|  | ... | ... |
|  | TS31 | NONE |
| CV3 | TS00 | NONE |
|  | ... | ... |
|  | TS31 | NONE |
| ... | ... | ... |

The CPU 28 then decides to use a vacant slot (TS00 herein) among the times slots of the converter CV1 and writes a call type (audio communication) in the call type section of the time slot of Table 4.

The CPU 28 instructs the converter CV1 to connect 64 kbps AUDIO to the terminal having an address A. B. C. D1/UDP1 by using the time slot TS00. Table 4 shows that by using the time slot TS01 of the converter CV1, V.110 data transmission is performed to the terminal having an address A. B. C. D1/TCP1.

As described above, the converter is provided with the line concentration switch 230 and distributes the time slots TS00 to TS31 of the communication highway into the time slots TS000 to TS191 in the converter. Accordingly, the CPU 218 of the converter CV1 stores the connection situation table of a line concentration switch as shown in Table 5, and controls the line concentration switch 230 so as to connect a vacant time slot (TS000 herein) among the time slots in the converter, to which 64 kbps AUDIO has been connected, to the time slot TS00 of the communication highway. After connection, the CPU 218 writes the IP/port address of the computer terminal 50*a* in the connection section of Table 5.

TABLE 5

| CV TIME SLOT | TYPE OF CALL | HIGHWAY TIME SLOT | CONNECTION |
|---|---|---|---|
| TS000 | AUDIO | TS00 | A.B.C.D1/UDP1 |
| TS001 |  | NONE | NONE |
| ... |  | ... | ... |
| TS015 |  | NONE | NONE |
| TS032 | V.110 | TS01 | A.B.C.D1/TCP1 |
| TS033 | DATA | NONE | NONE |
| ... |  | ... | ... |
| TS039 |  | NONE | NONE |

TABLE 5-continued

| CV TIME SLOT | TYPE OF CALL | HIGHWAY TIME SLOT | CONNECTION |
|---|---|---|---|
| TS064 | PHS DATA | NONE | NONE |
| ... |  | ... | ... |
| TS071 |  | NONE | NONE |
| TS096 | MODEM DATA | NONE | NONE |
| ... |  | ... | ... |
| TS103 |  | NONE | NONE |
| TS128 | G3 FAX DATA | NONE | NONE |
| ... |  | ... | ... |
| TS135 |  | NONE | NONE |
| TS160 | G4 FAX DATA | NONE | NONE |
| ... |  | ... | ... |
| TS167 |  | NONE | NONE |

Table 5 shows that for the converter CV1, the time slot TS00 is connected to the audio bearer circuit 234 by using the time slot TS000 of the multiplexer/demultiplexer 232*a* and the time slot TS01 is connected to the V.110 bearer circuit 236 by using the time slot TS032 of the multiplexer/demultiplexer 232*b*.

After connection of the line concentration switch 230 in this manner, as in the case of the first embodiment, the telephone set 14*a* and the computer terminal 50*a* are connected together by way of the converter CV1. When a call is originated from the computer terminal 50*a* to the telephone set 14*a*, a procedure is the same as that in the first embodiment except connection control of the line concentration switch 230.

Therefore, according to the second embodiment, even if the exchange 210 is placed far from the computer network 16, it is possible to connect the communication highway to the computer network, bringing about the same effects as the first embodiment.

[Third Embodiment]

Figure 13:
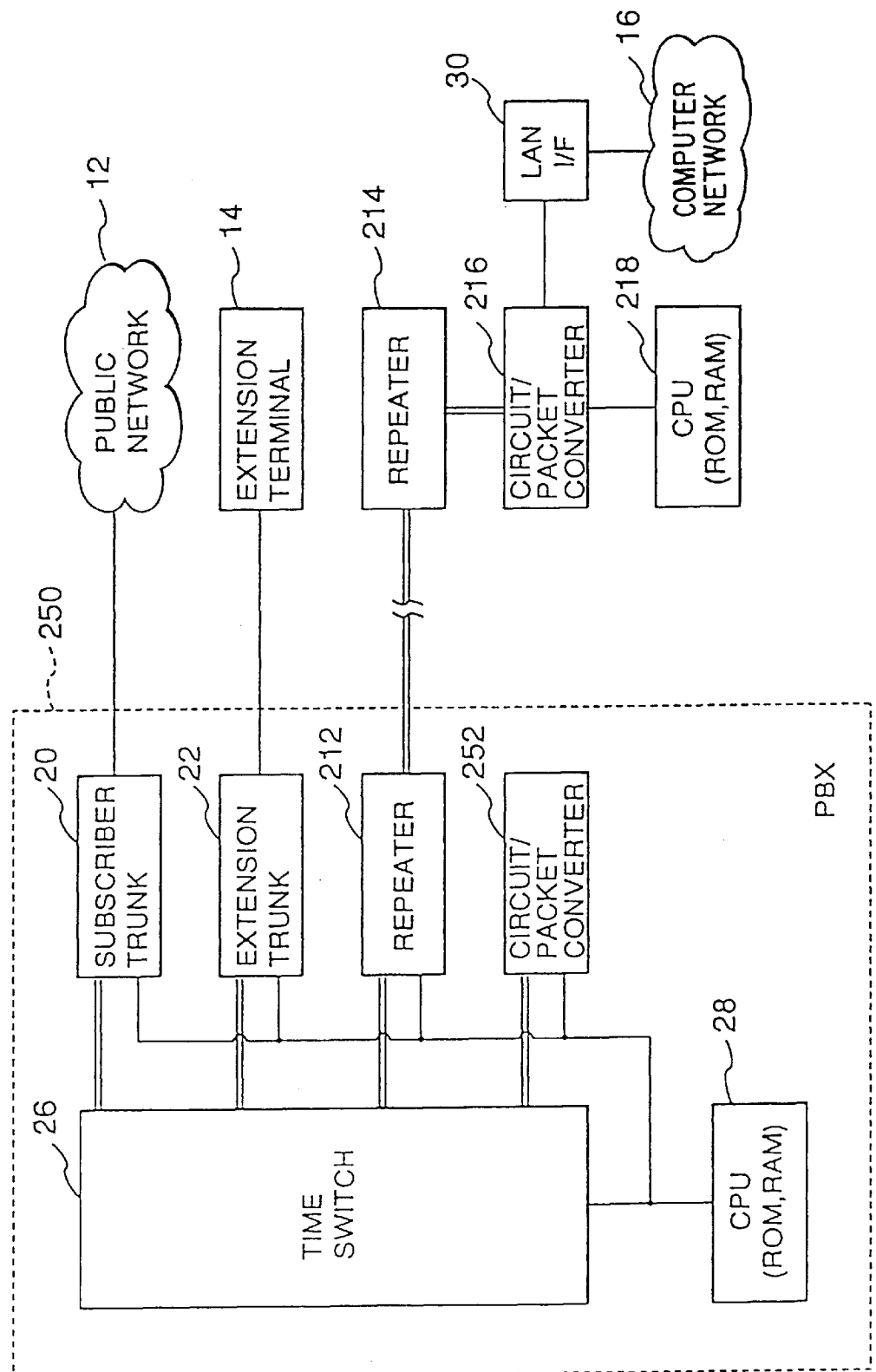
FIG. 13 is a block diagram showing in outline a third embodiment of a communication system of the present invention.

The third embodiment is a modified example of the second embodiment and its whole construction is outlined in FIG. 13. As in the case of the second embodiment, the circuit/packet converter 216 is connected by way of the repeaters 214 and 212 to the time switch 26 in the PBX 10, and the CPU 28 of the PBX and the CPU 218 of the converter are separately provided. However, different from the second embodiment, call control packets are communicated between the computer network 16 and the PBX 10 through the same the LAN as in the case of communication data, without providing the LAN 226 exclusive for call control packet transmission.

Accordingly, a circuit/packet converter 252 for control packets is also provided in the PBX 10.

Figure 14:
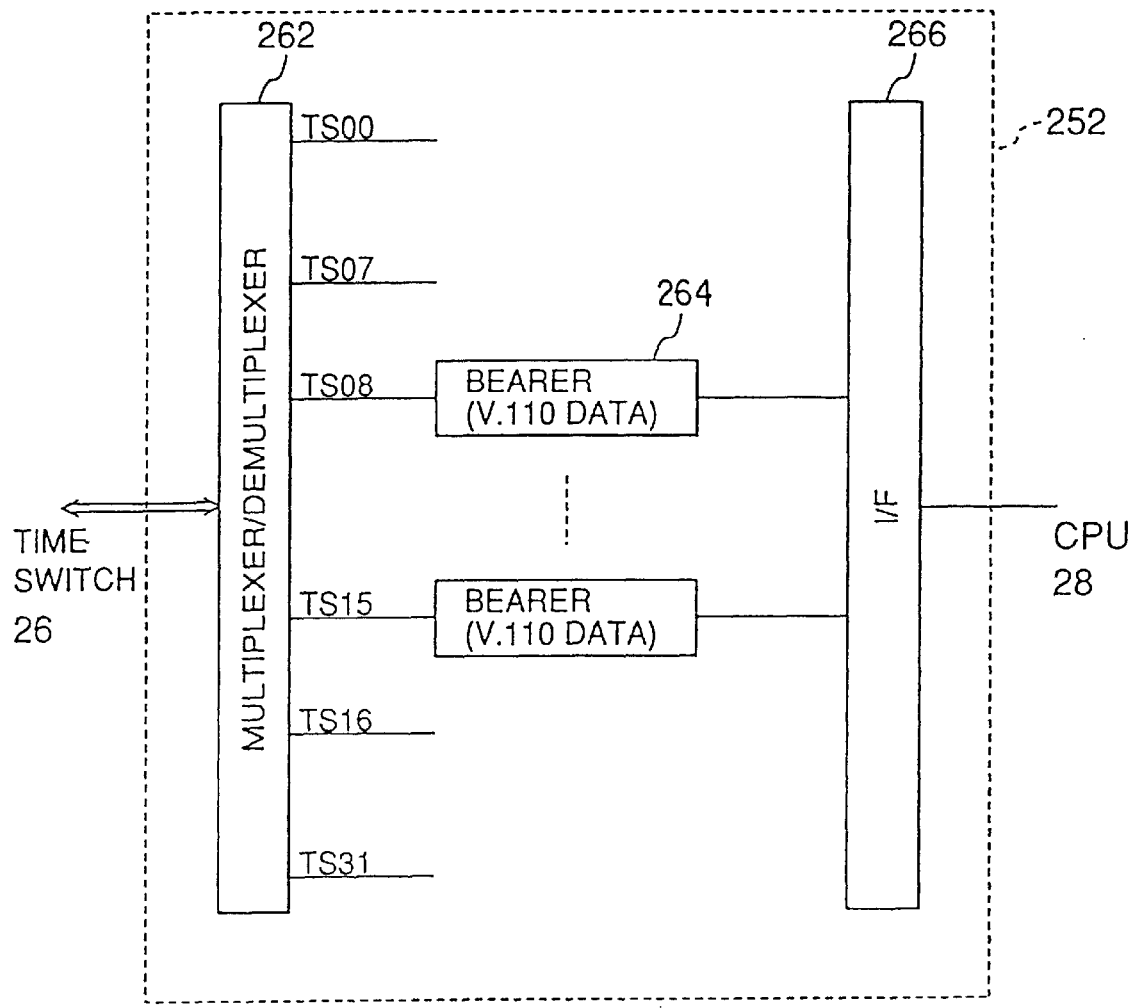
FIG. 14 is a block diagram showing in detail a structure of a circuit/packet converter in a private branch exchange of FIG. 13.

FIG. 14 illustrates the circuit/packet converter 252 in the PBX 250 in detail. The converter 252 comprises a multiplexer/demultiplexer 262 connected to the communication highway from the time switch 26, V.110 bearer circuits 264 connected to the time slots TS08 to TS15 of the multiplexer/demultiplexer 262 and an interface 266 connected between the V.110 bearer circuits 264 and the CPU 28. The converter 252 converts a call control packet in the form of packet data from the CPU 28 into call control information in the form of circuit data and outputs this data to the communication highway. The converter 252 also converts call control information in the form of circuit data from the communication highway into a call control packet and sends this data out to the CPU 28. Thus, except that call control packets enter the CPU 28 in the PBX 250 through the converter, the communication highway, and the same the LAN as in the case of communication data, other portions of operation in the third embodiment are the same as that in the second embodiment.

Therefore, according to the third embodiment, even if the private branch exchange 250 is placed far from the computer network 16, it is possible to connect the computer network 16 and the private branch exchange 250 together only by way of the communication highway.

[Fourth Embodiment]

Next, explanation will be made of the fourth embodiment, wherein the present invention is applied to a system using a small capacity private branch exchange and a button type telephone set.

Figure 15:
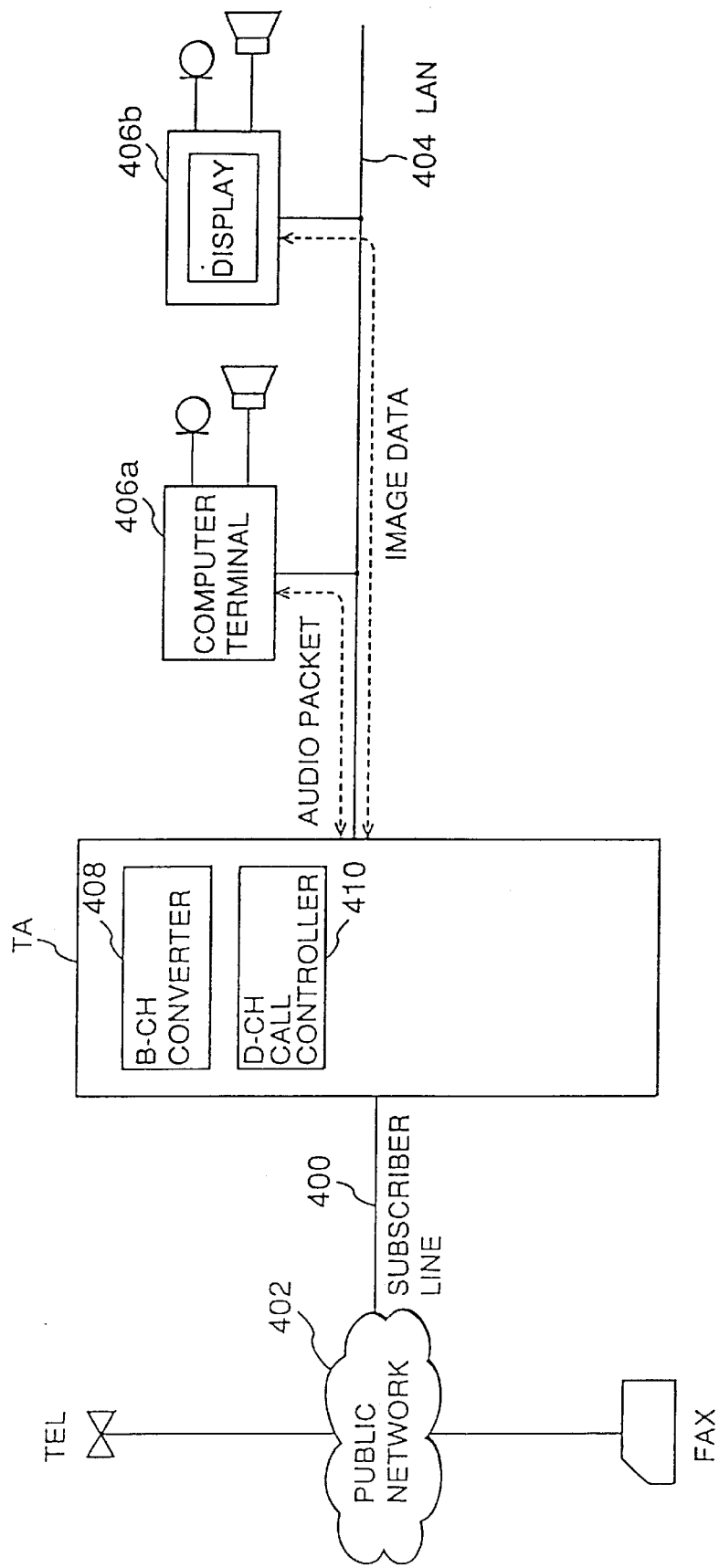
FIG. 15 is a block diagram showing in outline a fourth embodiment of a communication system of the present invention.

FIG. 15 illustrates an example of the construction thereof. In the fourth embodiment, a circuit/packet converter is provided as a part of function of an ISDN terminal adapter TA. More particularly, in the ISDN terminal adapter TA, the functions of the circuit/packet converters CV1, CV2, . . . and the functions of the CPUs 28 and 218 described above with reference to the first to third embodiments are provided.

This ISDN terminal adapter TA is connected to an ISDN public switched telephone network (PSTN) 402 through an ISDN subscriber line 400 using, for instance, ISDN primary group interface lines, and then connected to another telephone set TEL, a G4 facsimile equipment FAX, or other communication terminals through this PSTN. This may also be connected to another computer network (not shown) through the public switched telephone network 402. The ISDN terminal adapter TA also serves as an ISDN router.

Meanwhile, the ISDN terminal adapter TA is connected to computer terminals 406*a*, 406*b*, . . . composed of personal computers, work stations, or the like through a LAN 404. These computer terminals 406*a* and 406*b* have a microphone and a speaker for audio communication, and a display section for television conferences. These are further provided with various control functions as circuit switching type terminals necessary for audio communication and television conferences as described above.

The ISDN terminal adapter TA comprises a B channel converter 408 for converting audio data packets and a D channel call control section 410 for converting call control packets. In the D channel call control section 408, when a call is generated relating to the computer terminal 406*a* or 406*b*, a call control packet is analyzed and converted and thereby a communication channel is connected between the computer terminal 406*a* or 406*b* and the public switched telephone network 402. In the B channel converter section 408, when a call is generated relating to the computer terminal 406*a* or 406*b*, a circuit/packet conversion function is selected in accordance with the type of the call and thereby data conversion/connection is performed between the ISDN circuit line and the LAN.

In such a system, as in the case of the first to third embodiments, each computer terminal 406*a* or 406*b* is permitted to perform high quality audio and image communications by using the ISDN subscriber line 400. Moreover, since it is not necessary to pull in any ISDN line to each computer terminal 406*a* or 406*b*, making it unnecessary to provide any interface boards, the computer terminal 406*a* or 406*b* may be made simple and small in structure and its costs will be reduced.

It should be understood that the present invention is not limited to the above-described embodiments and various changes and modifications will be effectuated in the kinds and structures of the LAN and the communication highway, the structures and installation positions of the circuit/packet converter, the structures of the private branch exchange and the kinds and functions of the computer terminal within departing from the spirit and the scope of the present invention. For example, also in the first embodiment, a multiplexer/demultiplexer may be provided for each call type and a line concentration switch may be provided between the communication highway and a plurality of multiplexers/demultiplexers.

As discussed above, according to the present invention, the computer network, to which the computer terminal has been connected, is connected to the communication highway of the exchange by the circuit/packet converter, and when a call is originated relating to the computer terminal, the communication channel is set up between the computer terminal and the private branch exchange passing through the computer network, the circuit/packet converter, and the communication highway, thereby making it possible thereafter to perform data transmission between the computer terminal and a destination terminal by way of the communication channel. As a result, it is possible to provide a local area communication system capable of performing high quality and real time communication irrespective of a transmission distance, with a simple, structure and without pulling in any lines other than a computer network, for instance the LAN, to the computer terminal.

Furthermore, the computer terminal must be connected only to the computer network and it is not necessary to pull in other communication lines, for instance the ISDN line of the public switched telephone network. Accordingly, it is not necessary to provide any ISDN interface boards, etc., in the computer terminal in addition to the LAN interface. This makes it possible to make simple and small the computer terminal and reduce a financial load on the user.

What is claimed is:

1. A communication system connected to a computer network and capable of communicating plural kinds of data, comprising:
   an exchange including communication highways, each of which is formed of time slots multiplexed in a time-divisional manner, and a time switch for switching among communication highways, wherein each of the time slots of the communication highway is allocated to any of the plural kinds of data; and
   interface means provided in a casing of said exchange and connected between said computer network and the communication highway, for connecting a computer terminal in said computer network to the time slot of the communication highway in accordance with data type,
   wherein said computer terminal has a telephone number and an address for each data type to be communicated, and
   wherein said interface means comprises
      interface circuits having communication functions in accordance with data types to be communicated, each interface circuit being connected to any of the time slots of the communication highway,
      means for connecting a vacant time slot to said computer terminal in accordance with data type to be communicated, and
      a first table indicating an address of said computer terminal for each data type and a second table indicating an address of the computer terminal connected to each time slot.

2. A communication system according to claim 1, wherein said computer network comprises:

local area networks; and an internet for connecting the local area networks together, and the address comprises an IP address and a TCP/UDP address.

3. A communication system connected to a computer network and capable of communicating plural kinds of data, comprising:

an exchange including communication highways, each of which is formed of time slots multiplexed in a time-divisional manner, and a time switch for switching among communication highways, wherein each of the time slots of the communication highway is allocated to any of the plural kinds of data; and interface means provided in a casing of said exchange and connected between said computer network and the communication highway, for connecting a computer terminal in said computer network to the time slot of the communication highway in accordance with data type, wherein said interface means comprises interface circuits having communication functions in accordance with data types to be communicated, each interface circuit being connected to any of the time slots of the communication highway, means for connecting a vacant time slot to said computer terminal in accordance with data type to be communicated, a first table indicating an address of said computer terminal for each data type, a second table indicating an interface connected for each address of said computer terminal, and a third table indicating an address of the computer terminal connected for each time slot for each interface, and wherein said computer network comprises local area networks, an internet for connecting the local area networks together, and said computer terminal has a telephone number and an address for each data type to be communicated.

4. A communication system according to claim 3, wherein the address comprises an IP address and a TCP/UDP address.

5. A private branch exchange capable of connecting a computer which communicates plural kinds of data to a computer network, the private branch exchange comprising:

communication highways each of which is formed of time slots multiplexed in a time-divisional manner, each of the time slots being allocated to any of the plural kinds of data;

a time switch for switching the communication highways; and interface means connected between said computer network and the communication highway, for connecting a computer terminal in said computer network to the time slot in the communication highway in accordance with data type, wherein said computer terminal has a telephone number and an address for each data type to be communicated, and wherein said interface means comprises interface circuits having communication functions in accordance with data types to be communicated, each interface circuit being connected to any of the time slots of the communication highway, means for connecting a vacant time slot to said computer terminal in accordance with data type to be communicated, a first table indicating an address of the computer terminal for each data type, and a second table indicating an address of a computer terminal connected for each time slot.

6. A private branch exchange according to claim 5, wherein said computer network comprises:

local area networks; and an internet for connecting the local area networks together, and the address comprises an IP address and a TCP/UDP address.

7. A private branch exchange capable of connecting a computer which communicates plural kinds of data to a computer network, the private branch exchange comprising:

communication highways each of which is formed of time slots multiplexed in a time-divisional manner, each of the time slots being allocated to any of the plural kinds of data;

a first table indicating an address of the computer terminal for each data type and a second table indicating an address of the computer terminal connected for each time slot;

a time switch for switching the communication highways; and interface means connected between said computer network and the communication highway, for connecting a computer terminal in said computer network to the time slot in the communication highway in accordance with data type, wherein said computer terminal has a telephone number and an address for each data type to be communicated, wherein said interface means comprises a third table indicating a communicated data type allocated for each time slot and a fourth table indicating an address of the computer terminal connected for each time slot for each multiplexer/demultiplexer;

interface circuits having communication functions in accordance with data types to be communicated, each interface circuit being connected to any of the time slots of the communication highway, and means for connecting a vacant time slot to said computer terminal in accordance with data type to be communicated, wherein each of the interface circuits is connected to a multiplexer/demultiplexer for each communication function and any one of the multiplexers/demultiplexers is connected to the communication highway by way of a line concentration switch.

8. A private branch exchange according to claim 7, wherein said computer network comprises:

local area networks; and an internet for connecting the local area networks together, and the address comprises an IP address and a TCP/UDP address.

9. A private branch exchange capable of connecting a computer which communicates plural kinds of data to a computer network, the private branch exchange comprising:

communication highways each of which is formed of time slots multiplexed in a time-divisional manner, each of the time slots being allocated to any of the plural kinds of data;

a time switch for switching the communication highways; and interface means connected between said computer network and the communication highway, for connecting a computer terminal in said computer network to the time slot in the communication highway in accordance with data type, wherein said interface means comprises interface circuits having communication functions in accordance with data types to be communicated, each interface circuit being connected to any of the time slots of the communication highway, and connected to a multiplexer/demultiplexer for each communication function and any one of the multiplexers/demultiplexers is connected to the communication highway by way of a line concentration switch, and means for connecting a vacant time slot to said computer terminal in accordance with data type to be communicated, wherein said computer network comprises local area networks, and an internet for connecting the local area networks together, and said computer terminal has a telephone number and an address for each data type to be communicated, said exchange comprises a first table indicating an address of a computer terminal for each data type, a second table indicating an interface of a computer terminal connected for each address, and a third table indicating an address of a computer terminal connected for each time slot for each interface, and said interface means comprises a fourth table indicating a communicated data type allocated for each time slot and a fifth table indicating an address of a computer terminal connected for each time slot for each multiplexer/demultiplexer.

10. A private branch exchange according to claim 9, wherein the address comprises an IP address and a TCP/UDP address.

11. A private branch exchange capable of connecting a computer which communicates plural kinds of data to a computer network, the private branch exchange comprising:

communication highways each of which is formed of time slots multiplexed in a time-divisional manner, each of the time slots being allocated to any of the plural kinds of data;

a time switch for switching the communication highways; and interface means connected between said computer network and the communication highway, for connecting a computer terminal in said computer network to the time slot in the communication highway in accordance with data type, wherein said computer terminal has a telephone number and an address for each data type to be communicated, and said interface means comprises a first table indicating and address of the computer terminal for each data type, and a second table indicating an address of a computer terminal connected for each time slot.

* * * * *

UNITED STATES PATENT AND TRADEMARK OFFICE
CERTIFICATE OF CORRECTION

PATENT NO.   : 6,563,817 B1
DATED        : May 13, 2003
INVENTOR(S)  : Murai

It is certified that error appears in the above-identified patent and that said Letters Patent is hereby corrected as shown below:

<u>Column 20,</u>
Line 27, change "and address" to -- an address --.

Signed and Sealed this

Seventh Day of October, 2003

JAMES E. ROGAN
*Director of the United States Patent and Trademark Office*